US006914402B2

(12) United States Patent
Gabler et al.

(10) Patent No.: US 6,914,402 B2
(45) Date of Patent: Jul. 5, 2005

(54) METHOD FOR SYNCHRONIZED OPERATION OF MACHINES HAVING AXES ACTUATED BY SINGLE DRIVES

(75) Inventors: Thomas Gabler, Lohr am Main (DE); Karin Steudel, Lohr am Main (DE); Dieter Staub, Rechtenbach (DE)

(73) Assignee: Rexroth Indramat GmbH, Lohr am Main (DE)

( * ) Notice: Subject to any disclaimer, the term of this patent is extended or adjusted under 35 U.S.C. 154(b) by 0 days.

(21) Appl. No.: 10/474,100

(22) PCT Filed: Apr. 8, 2002

(86) PCT No.: PCT/DE02/01284

§ 371 (c)(1),
(2), (4) Date: Feb. 11, 2004

(87) PCT Pub. No.: WO02/082192

PCT Pub. Date: Oct. 17, 2002

(65) Prior Publication Data

US 2004/0133287 A1 Jul. 8, 2004

(30) Foreign Application Priority Data

Apr. 6, 2001 (DE) ......................................... 101 17 455

(51) Int. Cl.[7] ............................................. G05B 11/01
(52) U.S. Cl. ............. 318/560; 318/568.17; 318/568.18; 318/568.2; 318/162; 318/561; 700/56; 700/57; 700/69; 700/160; 700/65
(58) Field of Search .............................. 700/56, 57, 61, 700/63, 69, 70, 71, 160, 159, 186, 188, 192, 193; 318/560, 561, 568.17, 568.18, 568.2, 162

(56) References Cited

U.S. PATENT DOCUMENTS

| | | | | |
|---|---|---|---|---|
| 4,532,794 A | * | 8/1985 | Mauderer | 72/442 |
| 4,807,374 A | * | 2/1989 | Kasberger | 37/443 |
| 5,659,480 A | | 8/1997 | Meyer | |
| 5,758,962 A | * | 6/1998 | Ismar | 366/97 |
| 5,984,107 A | * | 11/1999 | Bleh | 209/320 |
| 6,609,889 B1 | * | 8/2003 | Vilsboll | 416/1 |
| 2004/0134364 A1 | * | 7/2004 | Schultze et al. | 101/248 |

FOREIGN PATENT DOCUMENTS

| | | |
|---|---|---|
| DE | 42 14 394 A1 | 11/1993 |
| DE | 44 20 598 A1 | 12/1995 |
| DE | 195 27 199 A | 1/1997 |
| DE | 196 26 287 A1 | 2/1997 |
| EP | 0 816 963 A | 1/1998 |
| EP | 0 930 552 A | 7/1999 |
| EP | 199 34 044 A | 1/2001 |

OTHER PUBLICATIONS

Synax 6 Dezentrales System Zur Synchronisierung Von Maschinenachsen, Rexroth Indramat GmbH, 2000.

* cited by examiner

*Primary Examiner*—Ramesh Patel
(74) *Attorney, Agent, or Firm*—Michael J. Striker

(57) ABSTRACT

In a method for operating machines (138) with a plurality of shafts (102, 110, 111), in which the shafts (102, 110, 111) are each driven, synchronized with one another, by individual drive mechanisms (103) belonging to them, in accordance with an electronic, chronological guide shaft function, which corresponds to an instantaneous position of a guide shaft L, and the motions of a plurality of derived shafts (102, 110, 111) are derived from the guide shaft L in accordance with conversion functions that correspond to respective predetermined mechanical conversions (106, 107, 108, 109) with respect to the guide shaft L, it is proposed, in order to improve the method in such a way that—particularly when there is a large number of shafts to be regulated—simple startup at comparatively little expense for equipment is permitted, that all the shafts (102) of at least one group (117) of shafts, which correspond to one another in terms of the conversion (106, 107, 108, 109), obey an electronic, chronological following guide shaft function, which corresponds to an instantaneous position of a following guide shaft F and is formed by linking the applicable conversion function and the guide shaft function.

7 Claims, 6 Drawing Sheets

Figure 1:
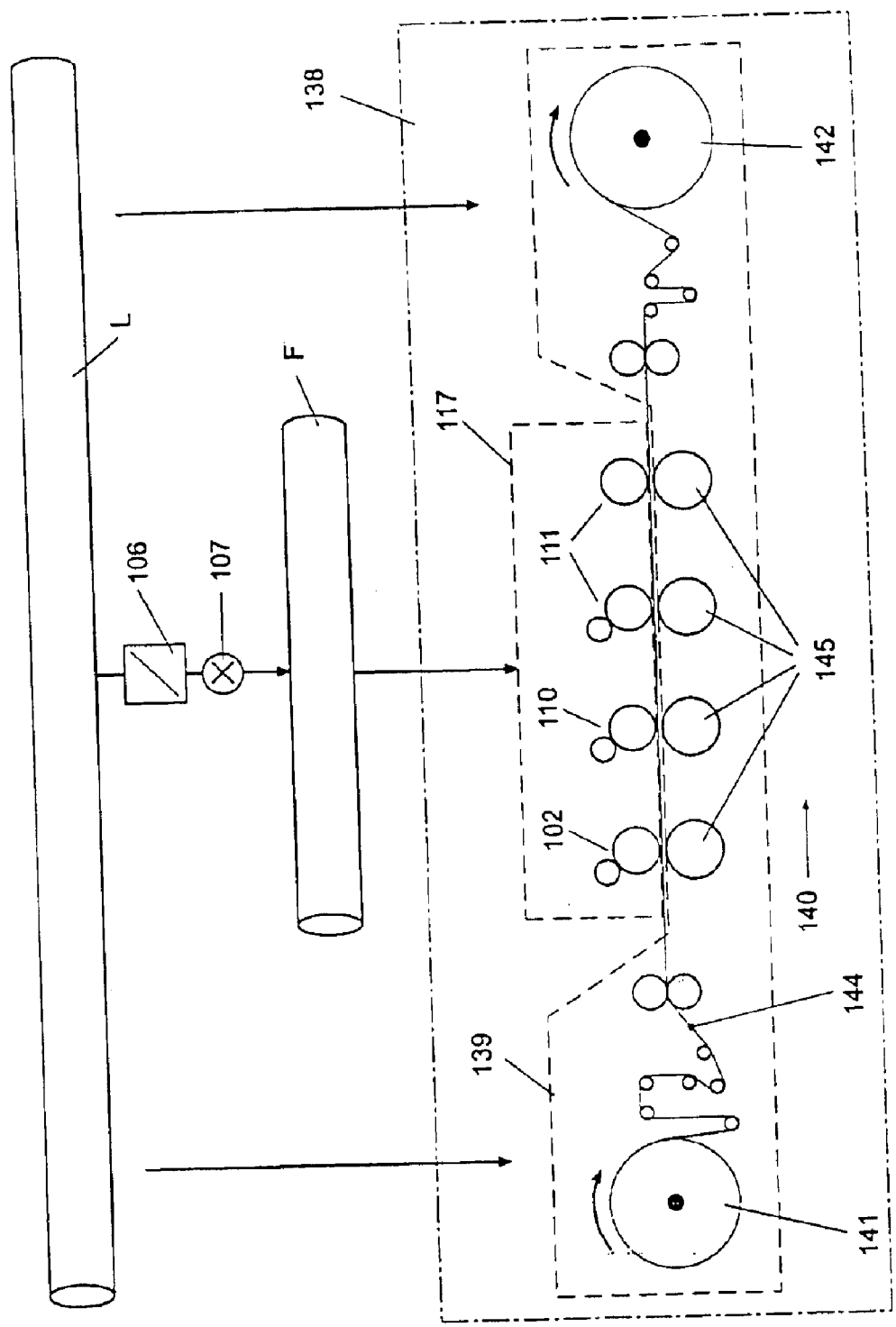

METHOD FOR SYNCHRONIZED OPERATION OF MACHINES HAVING AXES ACTUATED BY SINGLE DRIVES

The invention relates to a method for the synchronized operation of machines with a plurality of shafts, in which the shafts are driven, synchronized with one another by means of respective individual drive mechanisms belonging to them, in accordance with an electronic, chronological guide shaft function. Such a machine has, among other elements, transport shafts and processing shafts, for instance with corresponding cylinders, which are driven with servo drives, comprising a servo motor and a drive mechanism. For the sake of simplicity, reference will be made only to the shafts (servo shafts).

Such machines can for instance be printing presses, such as rotary printing presses or sheet-fed printing presses, paper-processing machines and packaging machines, and production machines or production lines. In general, this method is used in comparatively large, automated machines, where a plurality of shafts, driven by individual drive mechanisms, are synchronized with one another by means of a guide shaft.

This principle of the so-called "electronic vertical shaft" has meanwhile gained nearly universal use in machines for processing webs of material. The applicable shafts, driven by individual drive mechanisms belonging to them, follow a higher-order chronological guide shaft function (because of the synchronization of the associated drive mechanisms, or via higher-order controls) and are thereby synchronized. The guide shaft function corresponds with an instantaneous position of what is for instance a virtual or in other words electronically generated guide shaft, or a real guide shaft. It can for instance reflect the course over time of the instantaneous position, that is, the angular position of the guide shaft; however, it can also include the course over time of the reversing switch, or other parameters that correspond to the instantaneous position of the guide shaft. In particular, it is an electronic, chronological train of set-point values. In such a context, "trains" means that the motion at the applicable shaft is derived from the guide shaft function, either directly or via a conversion function, which is equivalent to a mechanical conversion with regard to the guide shaft. As a result, gears, cam disks, offsets, or similar mechanical elements are simulated electronically.

In such an aforementioned (automated) machine, many such mechanical conversions are needed, such as gears, clutches, etc.

For that purpose, it is known for such derived shafts to be derived electronically from the respective guide shaft in accordance with associated conversion functions, which correspond to the predetermined mechanical conversions with respect to the guide shaft. When there is a large number of shafts and hence a correspondingly large number of drives, the problem arises that because of the predetermined updating cycle of the guide shaft function involved, chronological jittering adds up, depending on the number of shafts involved, in the manner of propagation of an error. The added-up total deviation is all the greater, the more shafts are involved in an updating cycle. Moreover, the expense for equipment and technology for providing a suitable mechanical conversion at each of the shafts is very high.

The object of the present invention is to disclose a method of the type defined at the outset which—particularly when there is a large number of shafts to be regulated—assures a greater degree of synchronicity of the shafts to be corrected, compared to the prior art, and at the same time permits simple startup at comparatively little effort and expense for apparatus.

This object is attained by the characteristics of claim 1. The invention offers the advantage that the shafts can be driven with overall a smaller deviation from the set-point value cycle predetermined by the guide shaft function. Furthermore, the expense for apparatus is reduced, and startup is facilitated substantially. In summary, as a result it is also possible for a relatively large number of shafts to be driven in accordance with the "electronic shaft"—while preserving synchronicity.

These advantages are attained in that a plurality of shafts, which correspond to one another in terms of the mechanical conversion, are combined into at least one group of shafts. One group of shafts that correspond to one another includes those shafts that have the same conversion with respect to a guide shaft; these can for instance be groups of shafts with the same or an equivalent gear speed increase, an equivalent coupling behavior, a common cam disk ratio, or combinations of the aforementioned conversions. For these shafts, the same mechanical conversion should then be accomplished.

The expense for apparatus and for processing for the mechanical conversion of the shafts drops drastically with the invention. This is because as a result of combining shafts that correspond to one another into groups of shafts that obey an electronic, chronological following guide shaft function, the corresponding conversions at the individual shafts become unnecessary. The electronic simulation is as a result equivalent to a mechanical realization. The mechanical parameters/elements are simulated directly by means of the electronic models.

The shafts of one group follow the electronic, chronological following guide shaft function—preferably directly, that is, without the action of additional guide shafts. This means that the motion at the corresponding shaft is derived directly or via a further (electronic) conversion from the chronological following guide shaft function. The following guide shaft function likewise corresponds to an instantaneous position of a following guide shaft. To that extent, what is said above for the guide shaft applies accordingly.

Because of this guide shaft—derived guide shaft— . . . —drive mechanism cascading, for the aforementioned group of shafts only the following guide shaft function is used for driving the shafts. This is a substantial simplification compared to the prior art, where the guide shaft alone was definitive for driving all the shafts of the machine, and the conversion had to be done individually, for instance at the drive level, for each shaft. To this extent, this considerable effort and expense are practically avoided or substantially reduced by the invention and replaced by the higher-order conversion into one following guide shaft for a plurality of drive mechanisms.

To that end, the following guide shaft function is formed of a linking of the definitive guide shaft function with a conversion function corresponding to the intended mechanical conversion. In the conversion function, preferably all the information about the desired or necessary mechanical conversion is simulated/contained. What is essential is that the aforementioned mechanical conversion is common to all the shafts of the group. Moreover, even individual shafts can be operated with further mechanical conversions.

The conversion function can be the correspondingly electronically converted conversion instruction, which is equivalent to the mechanical conversion, such as the gear ratio in the case of a gear function. This will be addressed in further detail hereinafter.

In any case, the result of a linkage of the chronological, electronic guide shaft function and the applicable conversion function—which as a rule is not chronological—is a correspondingly electronic, chronological following guide shaft function, which contains the aforementioned information pertaining to the mechanical conversion of the group of shafts.

By means of the uniform following guide shaft function for a group of shafts (which in an exceptional case can even be an individual shaft but is preferably many shafts), the synchronicity of the individual shafts is improved. That is, first, the number of drive mechanisms that belong to one updating cycle with regard to the following guide shaft is reduced overall. The number of shafts that obey a following guide shaft function of the invention, or a plurality of such following guide shaft functions, is as a rule always less than the number of shafts that follow the guide shaft in the prior art and that must then also be derived individually from it by means of the mechanical conversions. The number of conversions that are omitted is equivalent to the number of all the shafts that are combined into groups, minus the number of groups themselves. It is clear from this that as a rule, when the invention is employed, the number of mechanical conversions required may be only a fraction of the conversions present in the prior art.

Because of the use of a uniform conversion function, which is calculated in accordance with a mechanical conversion of higher order in terms of the shafts of the group and is of higher order and uniform for all the shafts of the group, it is possible compared to the prior art to omit many individual conversions at the shafts—as noted above. Nevertheless—already because of the reduction in cycle times involved—a high degree of synchronicity is attained, so that the invention has a dual use in this respect.

The conversion function, which has to be calculated only once for the group of shafts, can be used practically simultaneously and in uniform fashion for all the shafts and thus by itself offers a high degree of synchronicity of the shafts, without requiring further provisions for the purpose; on the contrary—as already noted—many individual conversions are deleted.

The technical provisions for transmitting set-point value cycles to the drive mechanisms of the group exist anyway in a machine according to the invention and can readily be used for the invention, so that in this respect as well, practically no increased expense for equipment occurs.

To preserve the precision of the shaft motion, a transmission protocol with a high bandwidth is preferred. This should amount to at least 32 bits and should assure that the precision of the shaft motion is preserved even under the influence of the conversion function.

Preferred features of the present invention are described in the dependent claims.

Depending on the type of the definitive mechanical conversions, the type of conversion function is predetermined. The invention is then already suitable for many applications, in which only a position offset for one group of shafts is needed, if the conversion function includes a position offset, relative to the instantaneous position of the guide shaft, that is determined by the mechanical conversion. Then the conversion function essentially comprises the conversion instruction that a constant position offset, or a position offset that varies over time, be added to the instantaneous position of the guide shaft. The extent of the position offset and its behavior over time can preferably be predetermined arbitrarily. For instance, a substantially constant position offset may be provided over a comparatively long period of time; on the other hand, the position offset can vary over time in accordance with the time constants involved. Many mechanical conversions can then be modelled, simply via the position offset that is easy to manipulate in terms of control technology.

In addition or as an alternative, it can be provided that the conversion function includes a function determined by the mechanical conversion and corresponding to a gear speed increase relative to the guide shaft. The conversion function then essentially includes the gear factor—which is constant or varies over time (see above)—namely the aforementioned gear speed increase, which is equally definitive for all the shafts of the group. The following guide shaft function is then in practical terms a guide shaft for the shafts of the group, which with respect to the (higher-order) guide shaft function has a gear speed increase as described above.

Moreover, alternatively or in addition, it can be provided that the conversion function includes a function, determined by the mechanical conversion, that corresponds to a cam disk function and/or clutch function relative to the guide shaft. In that case, what is said above applies accordingly for the "electronic" cam disk/clutch.

The aforementioned exemplary embodiments have the advantage that the functional relationship is predetermined and can be modelled electronically comparatively simply. Nevertheless, with these features—individually or in combination—many and practically all of the usual demands made of the mechanical conversion of shafts can be achieved in the machines in question. A possible limitation to only these methods of deriving the following guide shaft function thus exists, as a result of which the invention is suitable for practically all the applications that might occur.

The concept of the higher-order, group by group following guide shaft is applicable to practically all existing applications if a manual fine tuning, or one formed in accordance with a regulator, of the conversion function is intended. This fine tuning is then likewise of higher order, as used in the invention, for all the shafts of the group. Thus the aforementioned fine tuning is global; however, alternatively or in addition, a further fine tuning of the conversion function with respect to each individual shaft of a group may be provided. Then deviations in the drive mechanisms from one another, dictated by the fact that the following guide shaft is made uniform, can be compensated for by the fine tuning for each drive mechanism, or in other words individually at each shaft. As a result, an synchronicity that can be assured at all times under practically all conditions that may arise is preserved.

For the fine tuning in accordance with a regulator, coil regulators, dance regulators, tension (stress) regulators, or register regulators can be provided in printing presses.

In the sense discussed above, an additional position offset can in particular be provided that acts on only one following guide shaft signal, transmitted to the respective drive mechanism of the shaft of one group and generated in accordance with the following guide shaft, so that the applicable shaft is offset by this position offset relative to the following guide shaft. This position offset can likewise be predetermined practically arbitrarily—manually, for instance by typing, or in accordance with a regulation.

One field to which the invention can be applied is register correction in machines that process webs of material. The exemplary embodiment relates to a method for register correction in machines for processing webs of material as generically defined by the preamble to claim 1. Such a machine has transport stations and processing stations, for instance with corresponding driven cylinders. In this respect, for the sake of simplicity, reference will be made only to their shafts.

Such methods are employed for instance in rotary printing presses, paper processing machines or sheet-fed printing presses, when an already-processed or -printed web of paper is to be further processed or printed (insetting), so that the subsequent processing steps must be done at a longitudinal position that is oriented precisely relative to an imprint that has already been made on the paper web. This assures that for instance two successively applied printed motifs will coincide in the predetermined relative position on the paper. To achieve this, cooperating transport shafts and processing shafts are corrected relative to one another by means of the register correction.

In machines that process webs of material, the principle has meanwhile become established that the shafts of a processing machine or part of a machine be equipped with individual drive mechanisms synchronized with one another, thus for instance replacing a mechanical vertical shaft (see for instance the documentation of SYNAX 6, 2000, put out by Rexroth Indramat GmbH). To that end, the applicable shafts (as a result of the synchronization of the associated drive mechanisms, or via higher-order controls) obey a higher-order chronological guide shaft function and are thereby synchronized. In such a context, "obey" means that the motion of the applicable shaft is derived directly from the guide shaft function, or from the guide shaft function via an (electronic) conversion. The guide shaft function corresponds to an instantaneous position of a guide shaft that is for instance virtual, that is, electronically generated, or a real guide shaft. For instance, it can reflect the course over time of the instantaneous position, that is, the angular position of the guide shaft; however, it can also include the course over time of the speed of rotation or other parameters corresponding to the instantaneous position of the guide shaft. In particular, it is an electronic, chronological sequence of set-point values.

In addition, a plurality of register-tracking shafts are corrected relative to the guide shaft function in accordance with a scan of register marks of the webs of material. These shafts are corrected in terms of their instantaneous position, their instantaneous speed of rotation, or corresponding parameters. The extent of the correction is determined by the scanning of register marks. The register marks can for instance be printed on—as is usual in the prior art—and can be scanned optically.

It is known for each shaft to be corrected to be regulated with its own register regulator. The necessity therefore arises of parametrizing each shaft and its regulator individually and to optimize them in terms of the corrective motions and the synchronicity with the other shafts. The effort upon startup is accordingly great; furnishing such a high number of individual register regulators is additionally associated with high effort for apparatus and leads to high costs. Nevertheless, the synchronicity of the shafts to be corrected is not always satisfactory, since intrinsically, mechanically and electronically caused deviations can occur between the individual register regulators. The result can be fluctuations in the tension of the web.

It is also known to have one register regulator act simultaneously on a plurality of shafts. To that end, an individual correction signal is transmitted to each shaft—that is, to the applicable drive mechanism or applicable controller of the applicable element, such as the cylinder—where it is converted into the corresponding individual corrective motion. The effort and expense for this rises sharply with the number of shafts to be regulated, so that for a large number of shafts to be regulated—which is widely the case—this method can be employed only with limitations, if at all. Problems of synchronicity can also occur because of excessively long cycle times in transmitting the correction signal.

The object of the present invention is to disclose a method of the type defined at the outset which—particularly when there is a large number of shafts to be regulated—assures greater degree of synchronicity of the shafts to be corrected and at the same time permits simple startup at comparatively little effort and expense for apparatus.

This object is attained by the characteristics of claim 1.

The invention offers the advantage that with only a single register regulator, an arbitrary number of shafts can be regulated synchronously. This reduces the effort and expense for apparatus and makes startup substantially easier. A method according to the invention for register correction, while achieving these advantages, automatically leads to a maximum degree of synchronicity of the corrective motions.

These advantages are attained in that from a common scanning operation, a correction function that is common to a plurality of shafts to be corrected, and that in particular is chronological, is attained. This correction function is obeyed by all the shafts of one group of register-tracking shafts that correspond to one another in terms of the register correction. Accordingly, all the information for all the corrective motions is contained in the uniform correction function pertaining to all the shafts of the group. A group of register-tracking shafts that correspond to one another includes only shafts that are to be regulated with a common register regulator, for which accordingly the same register correction and the same scanning are definitive. These are shafts at a cohesive/uninterrupted web of material. In rotary printing presses, this can be some or all the shafts of one processing tower, such as a printing tower, or shafts of different processing towers, between which the web of material is not cut/not interrupted.

By the use of a uniform correction function that is calculated on the basis of only one register regulator and is uniform for all the shafts of the group, many register regulators can be eliminated, compared to the prior art. Nevertheless, a high degree of synchronicity is attained, so that the invention is doubly useful.

Even if only one register regulator for one group of shafts—which can also include many shafts—is used, a high degree of synchronicity is automatically assured, since for all the shafts of the group, it is possible to use only a single correction function—and thus only a single correction signal. Thus only a single signal has to be transmitted to the shafts of the group, as well. The correction function once ascertained can be used practically simultaneously and uniformly for all the shafts and thus automatically offers a high degree of synchronicity of the adjusting motions on the basis of the correction, without any further provisions of any kind for the purpose having to be made.

By means of the invention, it furthermore becomes possible for the first time to adjust a large number of shafts on the basis of only one register regulator while preserving a maximum degree of synchronicity. The adjusting motions can be ascertained for many shafts with only one register regulator and can then be used for all of these shafts and can be transmitted to these shafts practically simultaneously.

Preferred features of the present invention are described in the dependent claims.

The corrective motion can be made available and thus quickly to the applicable shafts, if the correction function essentially contains only the corrections relative to the guide shaft function and is used as such for the register correction. Because of the practically direct use of the correction signal, this signal can be ascertained with relatively little computer capacity, and in particular with little computation effort.

If the correction function is linked with the guide shaft function to form an additional, chronological register sequence-guide shaft function, then this linking can be done centrally and uniformly in the context of a register correction and transmitted to the appropriate shafts as a register sequence-guide shaft function; the individual shafts can then obey such a register sequence-guide shaft function practically directly and immediately, without decentralized derivations—which involve increased computation effort—having to be made at the individual shafts. The register sequence-guide shaft function then contains practically all the data for every shaft in one uniform signal. Since the technical provisions for furnishing and transmitting a guide shaft function must generally be made anyway, this is a way of attaining the object of the invention that is inherent in the method of the invention, and that can readily be integrated into the existing drive and regulating structures. There are then two guide shaft functions—namely, the unchanged guide shaft function and the register sequence-guide shaft function—for which as a rule the computation and transmission capacities already exist.

The type of correction function should be selected depending on the type of deviations (the extent to which the web of material "goes out of register", or in other words the extent of the deviations compared to what is specified by the register marks) expected or recorded (that is, those scanned in the context of the register correction). The invention is already suitable for many applications in which the deviation is practically constant, if the correction function includes a position offset, compared to the instantaneous position of the guide shaft, that is determined by the scanning of the register marks. In that case, the correction function essentially comprises a position offset that is constant or that varies in accordance with the scanning of the register marks. A register sequence-guide shaft function in this case has a deviation from the guide shaft that is correspondingly either constant or varies—preferably comparatively slowly over time.

In addition or as an alternative, it can be provided that the correction function includes a function, determined by the scanning of the register marks and corresponding to gear speed increase with respect to the guide shaft. In the case of a correction function that includes only the corrective motions, this is equivalent to a pure gear speed increase, which can likewise be constant or varies over time in accordance with the scanning. In the case of claim 3, this is equivalent to a register sequence-guide shaft function, which is derived from the (higher-order) guide shaft function by a gear speed increase.

By means of the aforementioned embodiments, a simplification is attained, namely a possible limitation to only two methods of deviations of the correction function or chronological register sequence-guide shaft function, as a result of which however the invention is suitable for practically all applications that arise.

Any remaining deviations between shafts of one group are minimized by the provision that the scanning is effected practically in a central region—in terms of the longitudinal direction of the web of material—of the register-tracking shafts. The deviations that may possibly remain as a rule have a continuous course—viewed in the longitudinal direction of the web of material—or in other words are practically equal to zero at the scanning point or at the sensor site, since the register correction is referred to this sensor. Measured in the longitudinal direction, they are as a rule strictly monotonous, and they change their sign at the sensor site. In that case, the aforementioned scanning point is the site where the scanning practically leads to the least possible maximum amount of individual deviations at the shafts of the group and at the same time to the smallest sum of amounts of the deviations of the individual shafts from the applicable set-point value.

Particularly in insetting applications in rotary printing presses, it is proposed that one group is provided that includes only transport shafts. The correction function or register sequence-guide shaft function is then definitive for all the transport shafts of the group, so that according to the invention, they can be corrected with high synchronicity. This leads to an extremely precise, common correction of the transport shafts relative to the processing shafts.

To achieve increased accuracy of processing in a register correction of the invention, it is proposed that in addition, a predetermined correction, which is simple in terms of the computation effort/capacity and expense, of processing shafts that in terms of the register correction correspond to the group of transport shafts is effected. The above definition of the corresponding shafts then applies accordingly. Because of this provision, an additional degree of freedom that is easy to achieve is introduced into the controlled system. A simple correction in this sense should be adequate for most cases to compensate for any deviations that might still occur. Precisely in the case of register correction, the requirements for coincidence of the processing with the positions predetermined by the register marks are very stringent. The aforementioned embodiment makes it possible in a simple way to improve this coincidence still further. Deviations that are practically identical for many processing shafts can be eliminated; deviations that may differ for different processing shafts can also be eliminated, however. The latter pertains in particular to a possibly remaining deviation that can occur because of the spacing of a processing shaft from the sensor site (in accordance with what has been said above).

A simple, effective correction along these lines can be attained by providing that the longitudinal error per unit of length of the web of material, and for each processing shaft to be corrected, its longitudinal spacing from the scanning point are ascertained, and the correction of the applicable processing shaft is formed essentially by the product of the longitudinal error and the longitudinal spacing. Since as a rule after the processing the web of material is divided into individual products, it is proposed that the web of material is subdivided into individual products of a predetermined product length, and the longitudinal error per product length is ascertained, and the correction of the applicable processing shaft is formed essentially by the product of the longitudinal error per product length and the quotient of the longitudinal spacing divided by the product length. This method is simplified in terms of the requisite computation performance/capacity. Intrinsically, as a rule it also leads to better coincidence (see above), since the deviation is referred to the product length. The product length is the definitive variable for the processing shafts anyway, and thus the calculation and conversion of the corresponding correction can be done simply and precisely.

The aforementioned additional correction can be realized by providing that a plurality of processing shafts to be corrected form one group as defined by claim 1. This reduces the number of correction calculations required—as a rule, by the number of shafts that are combined into one group or into groups, minus the number of such groups. Because of this combination into a group with corresponding corrections, a central structure with all the advantages of the invention is created; this central structure can be subordinate to other groups. Then processing shafts can be divided into a plurality of groups. What is essential is that the deviation within one group remains comparatively small.

The possible capacities of the method are exploited completely if at least one shaft independent of register is provided, which obeys the chronological guide shaft function. Then two or more guide shaft functions are provided, which are integrated into the system and are used by respective associated shafts; that is, the shafts that belong together obey the respective guide shaft function (or register sequence-guide shaft function).

Figure 2:
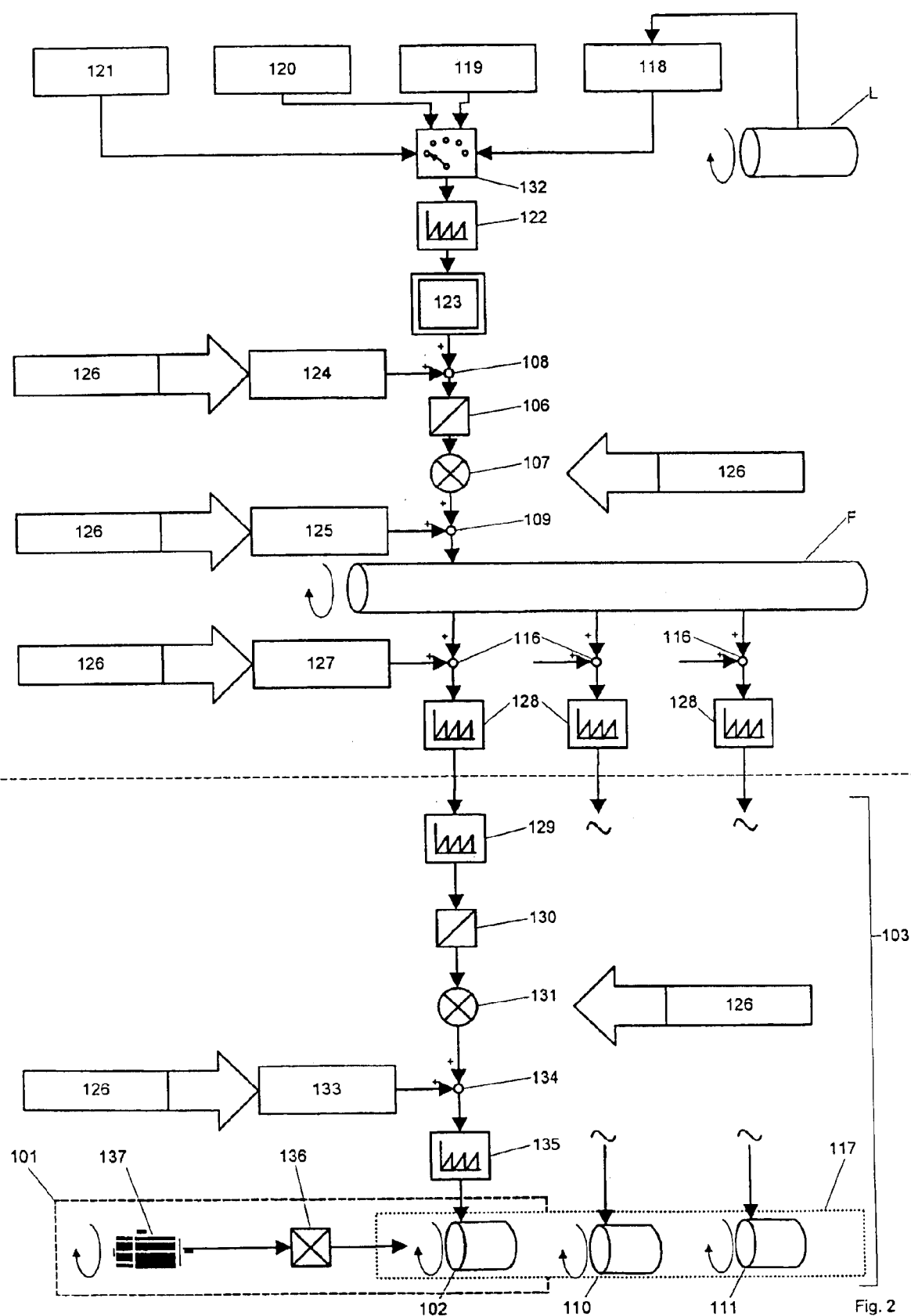
Figure 3:
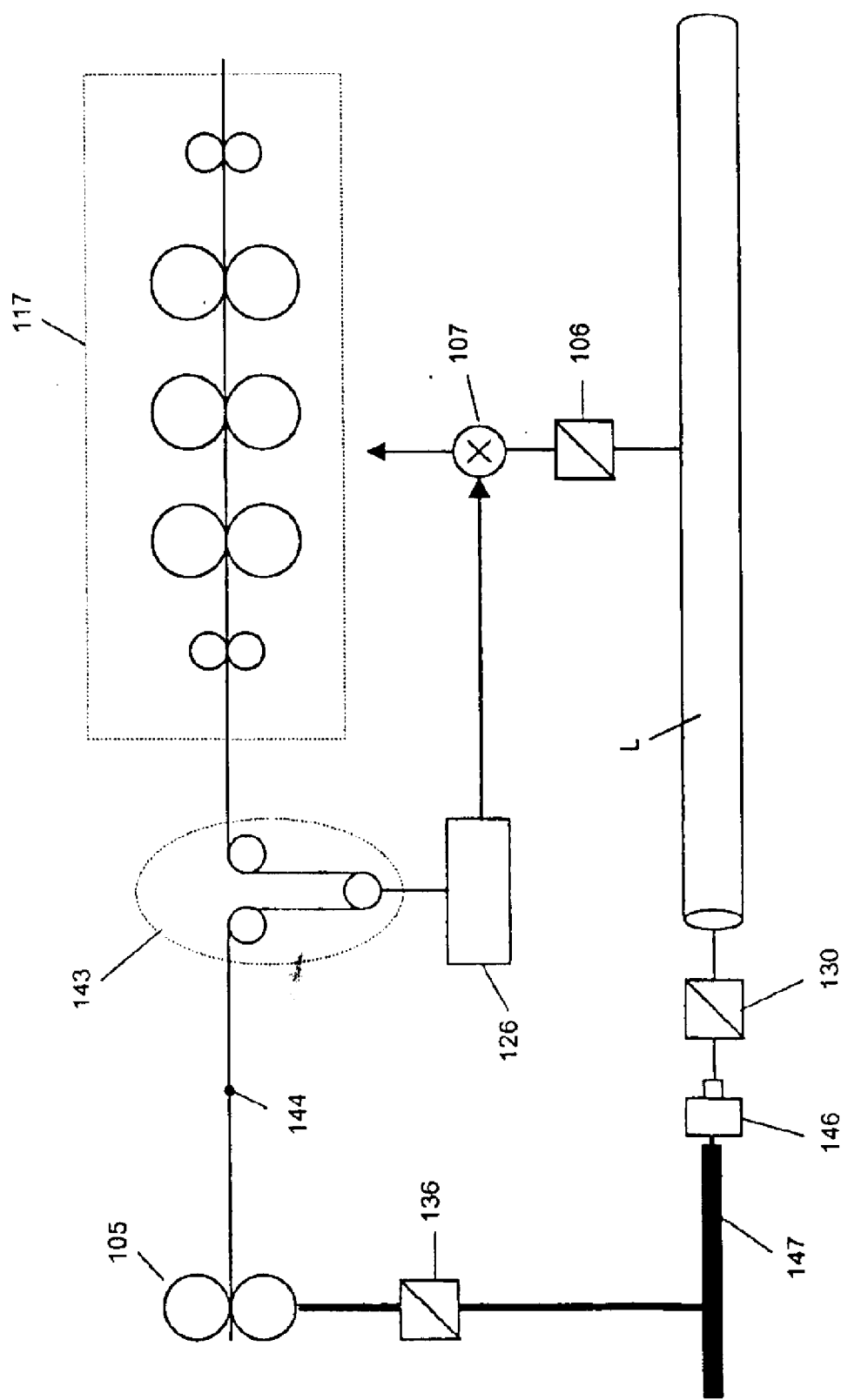
Figure 4A:
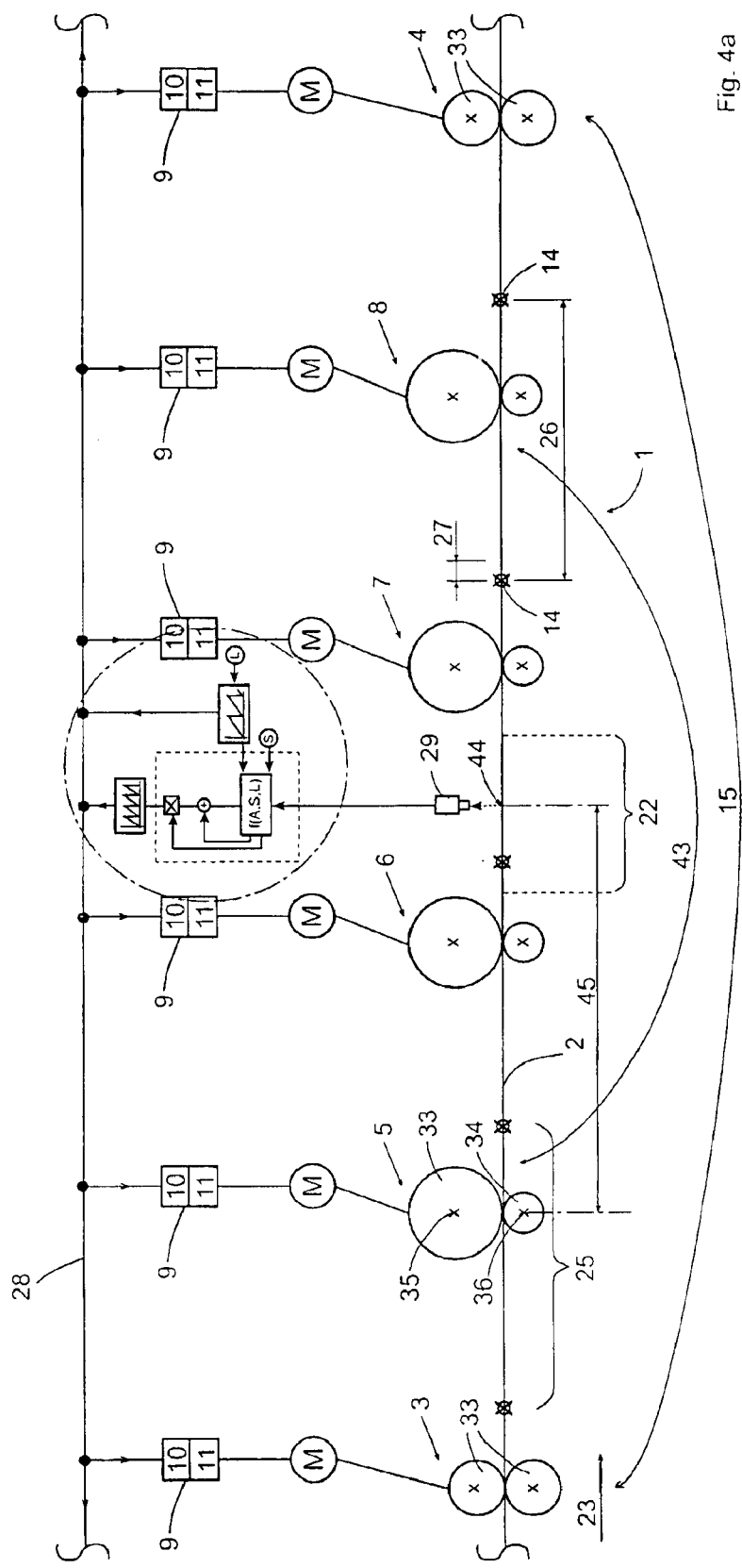
Figure 4B:
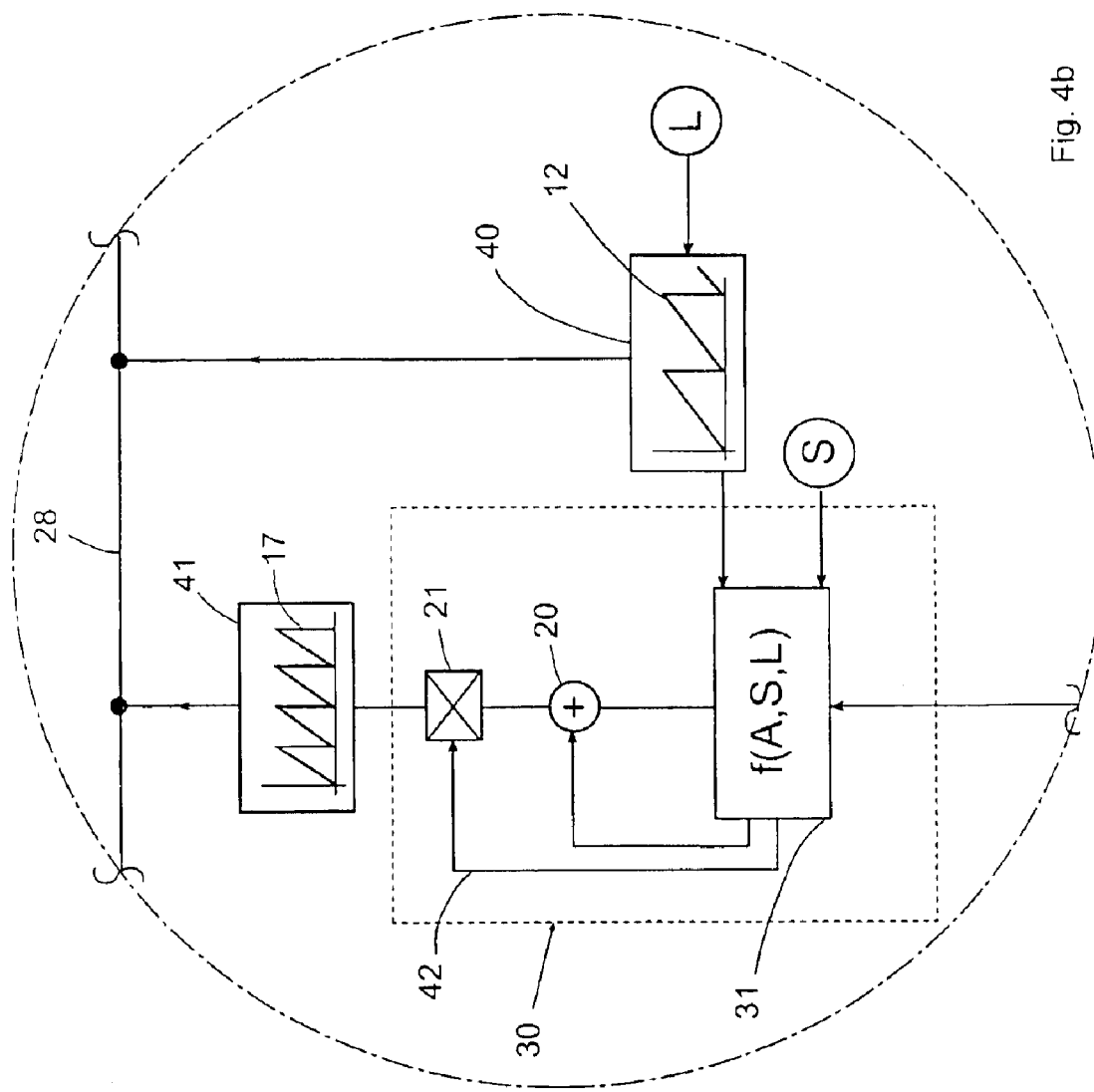
Figure 5:
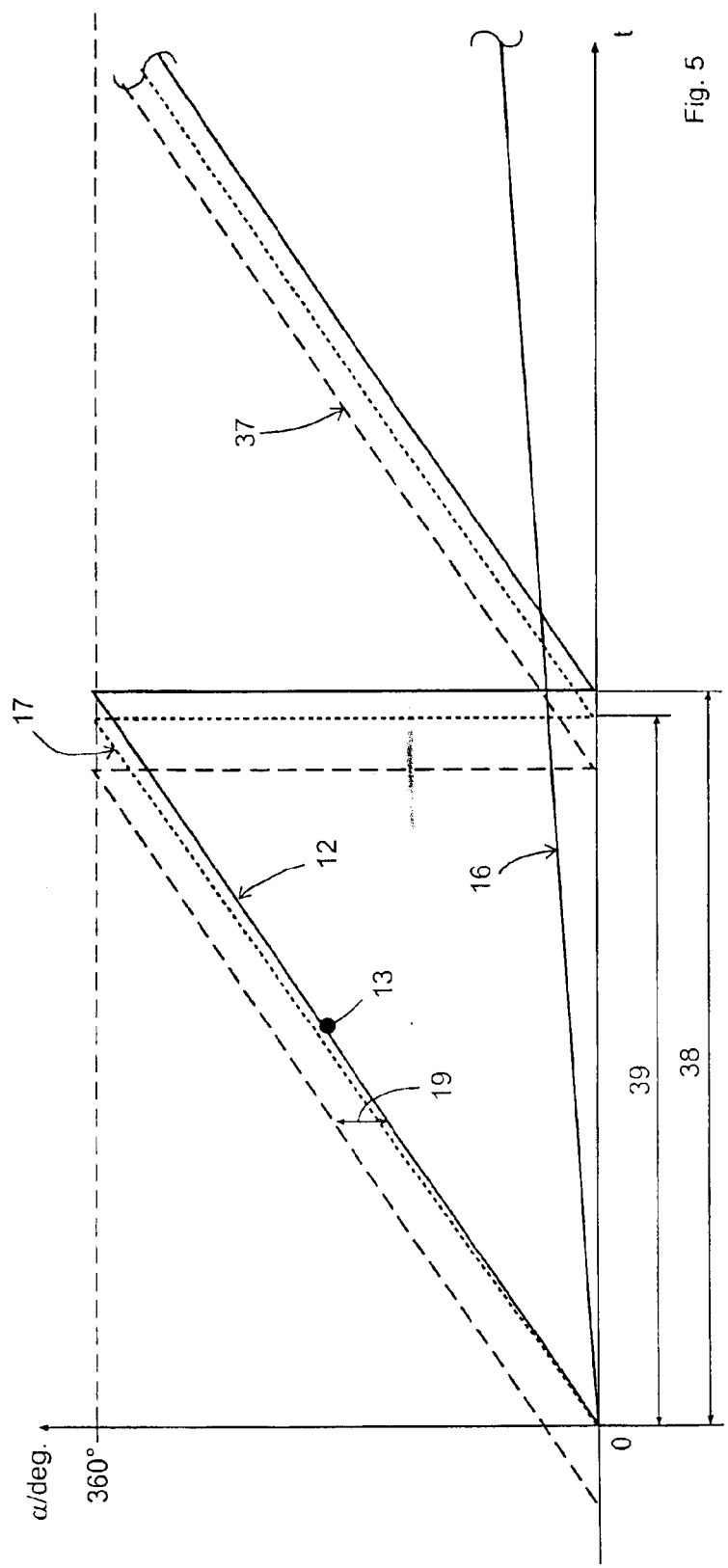

The invention will be described in further detail in terms of exemplary embodiments shown in the drawings. Shown are:

FIG. 1, schematically, guide shaft cascading in terms of the invention;

FIG. 2, a schematic illustration of a guide shaft structure for performing the method of the invention;

FIG. 3, a material processing machine with guide shaft cascading according to the invention;

FIG. 4a, a schematic sketch of a register regulator structure in a printing press;

FIG. 4b, a detail of part of FIG. 4a;

FIG. 5, a graph of a guide shaft function of a following guide shaft function.

Unless otherwise noted below, all the reference numerals always apply to all the drawings.

FIG. 1 schematically illustrates the principle of guide shaft cascading in accordance with the present invention in terms of a machine 138. From the higher-order guide shaft L, a following guide shaft F is derived, by way of a gear function 106 with a fine gear module 107. This following guide shaft acts on the group 117 of shafts 102, 110, 111. In the example shown, these are the processing shafts in a machine for processing a web of material 144. The web of material 144 is fed by means of transport shafts 145. In addition, a take-down spool 141 and a take-up spool 142 are provided. The transport shafts 145, the shafts of the drive mechanisms for the take-down spool 141 and the take-up spool 142, are derived directly from the guide shaft L—optionally with intervening individual derivations, or in other words corresponding mechanical conversion functions. In terms of the feeding direction 140, the processing station is followed by a tensile stress adjustment/web memory 143. A dance regulator could for instance be connected to it. The gear module 106 or fine gear module 107 is parametrized in accordance with the product format. As a result, upon a change of product format, synchronization as a whole can be done simply by suitable parametrizing of the definitive machine part, so that the shaft motion corresponds to the applicable product format.

A generic exemplary embodiment of the present invention is described in more detail in conjunction with FIG. 2:

This drawing schematically shows part of the regulator structure/set-point value cycle formation by the method of the invention. The structure shown is part of a machine 138 with a plurality of shafts 102, 110, 111. In the present description, these shafts are understood to mean the associated combination or associated station, comprising the drive mechanism (drive regulator, motor, gear) and the corresponding cylinders or other rotating bodies, or machine elements driven by the drive mechanism. These are individual elements of the machine, which are driven synchronized with one another by means of the invention. Reference will be made hereinafter therefore only to their shafts. In the description, the guide shafts L (guide shaft) and F (following guide shaft) must be distinguished from one another. These are (real or virtual) guide shaft sequences; these are the (usually discrete) chronological courses of instantaneous positions of the applicable guide shafts, or of parameters corresponding to the corresponding instantaneous positions.

The (individual) shafts 102, 110, 111 are driven as follows, synchronized in accordance with the electronic, chronological guide shaft function: The guide shaft L (which is the corresponding set-point value train) specifies the cadence for generating the guide shaft function. The guide shaft L can also act practically directly on downstream machine shafts 139. This then follows directly or via an associated, for instance individual, mechanical conversion of the guide shaft L.

The branch in the regulator hierarchy shown in FIG. 1 is derived entirely from the guide shaft L and is synchronized in a predetermined way with the guide shaft L. To that end, the guide shaft function is converted into a guide shaft 118, downstream of the guide shaft L, in accordance with which the guide shaft cycle 122 is generated. Alternatively, the guide shaft cycle 122 can also, by means of a real guide shaft 119 (for instance comprising the transducer signal of a shaft of an upstream machine or of a machine part with which the regulator hierarchy shown is to be synchronized), can follow a purely virtual guide shaft 120 (which for instance is an electronically generated set-point value train) or a positioning module 121. It is possible to switch among these alternatives as needed by means of a reversing switch 132—shown schematically here—for the input function.

The guide shaft cycle 122 is processed in a synchronization module 123, where an adaptation of the guide shaft cycle 122 with respect to the machine part corresponding to the regulator structure is effected.

In the machine 138 or machine part, there are a plurality of derived shafts 102, 110, 111, which—depending on the current production requirements in the machine 138 in question—are derived from the guide shaft L in accordance with conversion functions predetermined in this way. The conversion functions correspond to the conversions 106, 107, 108, 109; this will be addressed in further detail hereinafter. The derived shafts 102, 110, 111 correspond to one another, in the manner discussed above, in terms of the requisite mechanical conversion compared to the guide shaft L. This also includes the fact that the shafts 102, 110, 111 of the group 117 correspond to one another only in part. Preferably, however, the shafts mentioned have the same conversions from the guide shaft L, except for a few exceptions or slight deviations. These can then be derived further, compared to the shafts 102, 110, 111 of the group 117, via a separate, individual conversion by the higher-order conversion according to the invention. This will be addressed in further detail hereinafter.

All the shafts 102, 110, 111 of this group 117 obey a guide shaft signal that is output, via a mechanical conversion 106, 107, 108, 109, from the guide shaft L or from one of the transducers 119, 120, 121. Thus the mechanical conversion 106, 107, 108, 109 is subordinate to the guide shaft L and is derived from it via the aforementioned conversions 106, 107, 108, 109 and is uniform and of higher order with respect to all the shafts 102, 110, 111 of the group 117.

A sequence specified in accordance with the product requirement/machine requirements, of mechanical conversions 106, 107, 108, 109 is provided, which are predeterminable upon the configuration of the regulator structure and can be activated and deactivated individually and arbitrarily. The mechanical conversions 106, 107, 108, 109 are parametrized by a regulator module 126. First, an upstream offset addition 108 (bearing offset, predifferential) is provided. The associated regulator 126 can correspond to the controlled system of a register regulator, a tension regulator or a dance regulator at the correspond machine 138 or machine part. It can be embodied for instance in a PC, especially a PowerPC. In the offset addition, a fixed or favorable position offset is added to the synchronized guide shaft cycle 122. In the exemplary embodiment shown, this position offset is embodied as a predifferential; that is, it refers to the guide shaft cycle 122. Downstream, a further position offset 109 is provided, which in the manner of a postdifferential refers to the instantaneous position (or parameters corresponding to it) of a following guide shaft F. Between the two offset additions 108, 109, a gear module 106 and a fine gear module 107 are provided. These are purely electronic conversions of the guide shaft cycle 122. A parametrizing of the gear modules 106, 107 is also effected via a regulator 126 or by mechanical typing (which applies particularly to the parametrizing of the fine gear module 107).

Overall, by means of the mechanical conversions 106, 107, 108, 109, an (electronic) chronological following guide shaft function is generated, which corresponds to the motion of a following guide shaft F. This following guide shaft F contains the entire mechanical conversion 106, 107, 108, 109 in the form of a following guide shaft signal. This is a substantial advantage of the method of the invention. The following guide shaft F acts in higher order fashion on all the shafts 102, 110, 111 of the group 117, so that for the number of shafts 102, 110, 111 combined into the group 117, the common mechanical conversion 106, 107, 108, 109 has already been done and need not be done separately for each one of the shafts 102, 110, 111. This drastically reduces the effort and expense for equipment and control technology, lessening it essentially by the number of shafts combined into one group 117, minus the number of groups.

In the exemplary embodiment shown, the number of shafts 102, 110, 111 shown is only equal to three; in a machine for employing the method of the invention, the number of shafts 102, 110, 111 combined into one group 117 will be substantially higher as a rule. As a rule, it is between 5 and 60. It can be seen from this that the method leads to a drastic simplification and reduction of the effort and expense for control and equipment. The invention has still another use as well: In comparison to the number of shafts to be derived in the prior art, the number of shafts of a group is reduced. For instance, if 50 shafts are combined into five groups of ten shafts each, then the number of shafts that follow the updating cycle of the applicable following guide shaft F is only 10. Thus substantially shorter cycle times are achieved, which in this example act on the cycle times of the shafts by a factor of 5. It is no longer necessary to go through 50 forwarding cycles for updating the individual shafts; instead, only ten such cycles in each group are needed, which among the groups can as a rule be executed not sequentially but simultaneously. Thus the time required for one updating cycle in the example given amounts to only one-fifth that of the prior art.

Prior to the derivation of the following guide shaft cycles 128 for each of the shafts 102, 110, 111, one additional offset addition 116 each is provided, which can add one individual offset for each of the shafts 102, 110, 111. This individual offset is predetermined—as described above—by a regulator module 126 and is added to the corresponding signals via an additional offset transducer 127.

The regulator structure for the further shafts 110, 111 is left out, for the sake of simplicity. It will be described below as an example in terms of the applicable structure for the shaft 102 only. The guide shaft cycle 129 is optionally subjected once again to a drive gear module 130 and a drive/fine gear module 131 for fine adjustment and correction relative to the following guide shaft F. An additional drive offset adder, which is acted upon by a drive offset transducer 133 in accordance with a regulator 126, serves to impress an individual offset at the drive regulator level.

The set-point value cycle 135 generated from the aforementioned values finally acts on the shaft 102, or in other words on the drive regulator, the motor 137, and a mechanical gear 136 that might precede them. As a result, the applicable shaft 102 is on the one hand synchronized with the guide shaft L, but follows the following guide shaft F, which in turn is synchronized with the guide shaft L. Overall, as a result, a synchronized motion is imposed upon each of the shafts 102, 110, 111 while preserving the synchronicity. Nevertheless, the individual degrees of freedom of the shafts 102, 110, 111 are preserved by means of the provided regulation to the drive level 103, so that individual corrections of the various individual shafts 102, 110, 111 can certainly still be made.

FIG. 3 shows one further exemplary embodiment, in which a real guide shaft L is derived from a machine shaft 147. To that end, the machine shaft 147 is scanned, and a transducer 146 furnishes position data, for instance, from which the actual (real) guide shaft L is generated via gear module 130. Thus the machine part shown is coupled in synchronized fashion to an upstream machine, in which a web of material 144 is processed, for instance with the machine shaft 105 which is derived from the machine shaft 147 via a mechanical gear. To compensate for instance for fluctuations in web tension that can be caused by the decoupling, a tensile stress adjustment 143 is provided (for instance with a tensile stress regulator). An associated regulator module 126 parametrizes a fine gear module 107 (or an offset addition), by way of which the motion of the group 117 of shafts of the downstream machine is derived in groups (together with the gear module 106) from the guide shaft L.

FIG. 4a—in schematically simplified form—shows a processing machine 1 for processing a web of material 2. This is a rotary printing press, comprising a plurality of driven cylinders 33, each with associated contact-pressure cylinders 34.

The processing machine 1 has an input transport station, which is formed essentially by the transport shaft 3 with its two cylinders 33. On the other end (in terms of the longitudinal direction 23), there is an output transport shaft 4, again comprising two cooperating cylinders 33. Between the transport shafts 3, 4, there are four processing stations 5, 6, 7, 8, hereinafter for the sake of simplicity simply called processing shafts 5, 6, 7, 8.

The term "shaft" will be used here for the corresponding station with the associated cylinders 33, their motors M, and the associated drive mechanism 9. The term "shaft" should be distinguished in particular from the physical pivot axis 35, 36 of the respective cylinders 33, 34.

The transport shafts 3, 4 and the processing shafts 5, 6, 7, 8 cooperating with them are each driven by an associated individual drive mechanism 9. This replaces a continuous mechanical shaft (vertical shaft). For that purpose, it is necessary that the individual drive mechanisms 9 be synchronized with one another. To that end, the individual drive mechanisms 9 are supplied with guide shaft signal data (see below) via a data bus 28. For synchronization, the shafts 5, 6, 7, 8 obey a chronological guide shaft function 12, which is fed into the data bus 28 and transmitted over it to the individual drive mechanisms 9. Deviations are compensated for by the register correction by the provision that first register marks 14 (represented here by X's at the corresponding longitudinal positions) are scanned by an (optical) sensor 29. On the basis of the scan, a correction relative to the guide shaft function 12 is then calculated in the register regulator 30, and this correction initially acts only on the register-tracking shafts 3, 4. At first, no register correction of the other processing shafts 5, 6, 7, 8 is contemplated (although that can additionally be effected; see below), and so the register correction is equivalent to a relative correction between the transport shafts 3, 4 and the processing shafts 5, 6, 7, 8.

The guide shaft L (which is unaffected by the register correction) is represented here merely by a circle. It does not matter to the invention whether it is a virtual guide shaft, whose instantaneous position is generated purely electronically, or a so-called real guide shaft, whose instantaneous position is defined by scanning an actually physically present mechanical shaft, or by feedback from a drive mechanism.

According to the invention, a group 15 of the register-obeying guide shafts 3, 4 that correspond to one another in terms of the register correction is formed, as noted above in detail. For this group 15 of register-tracking shafts 3, 4, only one common scanning is performed. This is done at only a single scanning point 44, by means of the sensor 29, which can for instance be a photodiode or a CCD camera, with a downstream electronic evaluator for detecting the register marks.

From the common scanning, a correction function 16 that is likewise common to the group 15 of register-tracking shafts 3, 4 is derived. It can be formed from a set-point/actual comparison in accordance with the scanning of the register marks to form the local deviation, its derivation (that is, the speed), or functions corresponding therewith. In the exemplary embodiment shown, the correction function is formed by comparing the scanner outcome with the set-point value S and/or the guide shaft function 12, which for that purpose is fed—along with the scanning signal from the sensor 29—into an arithmetic unit 31. The set-point value S contains the information that tells which relative position on the web of material the register marks are to be located at the scanning point 44 with respect to the guide shaft function 12 and/or the processing shafts 5, 6, 7, 8.

From the control deviation (corresponding to the correction function 16) formed in the arithmetic unit 31 (see FIG. 1b), a register sequence-guide shaft function 17 is derived. This is schematically shown, for the sake of clarity, with a slope that deviates exaggeratedly greatly from the slope of the guide shaft function 12. The guide shaft function 12 is input into the register regulator 30. The linking of the correction function 16 with the guide shaft function 12 is also done in the register regulator 30 of the invention. Since the communication line is a data bus 28, both the (unchanged) guide shaft function 12 and the register sequence-guide shaft function 17 formed from the correction function 16 can be furnished to all the individual drive mechanisms 9; the applicable drive mechanism 9 is triggered or addressed solely in accordance with a variable setting of the predetermined, corresponding guide shaft function 12, or register sequence-guide shaft function 17. The freedom of selection is thus assured; that is, practically every shaft 3, 4, 5, 6, 7, 8 can, in accordance with the (pre-)setting, obey an arbitrary one of the guide shaft functions 12, 17 provided, or the correction function 16, after processing/adaptation—for instance, in the applicable drive regulator 10.

The applicable guide shaft function 12, 17 or the correction function 16 is thereupon processed in the drive regulator 10, and the respective motor M is driven, suitably synchronized/corrected in accordance with the drive regulator, via the power electronics 11.

How a register correction according to the invention functions is illustrated schematically in an enlarged detail in FIG. 4b:

For synchronization of the shafts present, a guide shaft function 12 is generally provided, which can be individually transmitted/addressed to each of the individual drive mechanisms 9 via the data bus 28 and synchronizes the applicable drive mechanism 9 in higher-order fashion. The register regulator 30 is shown in detail on the left side of the enlarged detail. There, from the set-point value S and the scanning signal A, the correction function 16 is formed and, in accordance with the correction with the higher-order guide shaft function 12, is processed into a register sequence-guide shaft function 17. It can be seen from the detail that individually, first on the base of the set-point value S, guide shaft function 12 or guide shaft L and a scanning signal A, a function f(A, S, L) is calculated in the arithmetic unit 31. This could be the correction function 16. In the present case, it is a (preferably instantaneous/updated) predetermination, in accordance with which, via the parameter line 42, the register sequence-guide shaft function 17 is derived from the guide shaft function 12. As shown in the detail, only one offset adder 20 and/or one gear element 21, which is addressed by the arithmetic unit 31 via the parameter lines 42, is provided for deriving the register sequence-guide shaft function 17. This means that in accordance with the scanning, either a pure position offset 19 or a gear derivation or both is used to derive the register sequence-guide shaft function 17. For forming the correction function 16 or register sequence-guide shaft function 17, either the extent of the position offset 19, or the gear speed increase for the gear element 21, or both are calculated, from the result of scanning, the set-point value (which can also be a chronological set-point value function) and the guide shaft function 12, and is updated, preferably in the context of the clock speed involved and the expected time constant for the regulator system. Via the parameter line, the parameters required to form this function are thus carried to the members 20, 21.

If no control deviation or correction is desired, then all the parameters can be dimensioned or predetermined such that the members 20 and/or 21 have no significance, and the register sequence-guide shaft function 17 is essentially the same as the guide shaft function 12. Both guide shaft functions 12, 17 present are sent onward via the respective guide shaft generators 40, 41 (for instance in the form of software in the arithmetic unit), addressed appropriately. The addressing will not be discussed in further detail here; however, it is done selectively for each individual drive mechanism 9 in accordance with its parameters, namely the spacing of the associated shafts 3, 4 from the scanning point 44, etc. This will be discussed in further detail hereinafter.

In addition or alternatively, a correction function 16 can also be provided which essentially contains only the corrections relating to the guide shaft function 12 and which—for the shafts 3, 4 of group 15—acts directly as a correction applied to the global synchronization cycle of the guide shaft function 12—specifically in the respective drive mechanism 9.

In addition to the transport shafts 3, 4, processing shafts 5, 8 can also be combined into a group 43. Its own, for instance additional, register-obeying guide shaft function acts on this group. It is also possible for all the processing shafts 5, 6, 7, 8 to be combined into a group. Then the processing shafts 5, 8 that are farthest away from the scanning point 44 are combined into a group 43, since for such a group any (residual) deviation that exists is especially great, as noted above. As for the register-tracking shafts 3, 4; 5, 8 of the groups 15; 43, the scanning is done practically in a central region 22, in terms of the longitudinal direction 23 of the web of material 2, or in other words practically in the middle between the aforementioned shafts. As a result— as noted above—any remaining (register) deviations from one another among the register-tracking shafts are minimized.

A correction that is simple in terms of computation effort acts on the processing shafts 5, 8 of the group 43. This correction is formed by dividing the web of material into products 25 of a product length 26, which in the present case matches the spacing of the register marks 14 (although this is not necessarily the case). By means of the register correction, the longitudinal error 27 (shown exaggerated here) per product length 26 is ascertained. For each processing shaft 5, 8 to be corrected, its longitudinal spacing 45 from the scanning point 44 is ascertained, and the correction of the processing shafts 5 is formed by the product of the longitudinal error and the quotient of longitudinal spacing 45 divided by product length 26.

Finally, FIG. 5 shows a graph of various guide shaft functions 12, 17, 37 and a correction function 16. The instantaneous position is plotted in angular degrees over time t. The register sequence-guide shaft function 17 and the register sequence-guide shaft function 37 are examples of corrective guide shaft functions derived from the unchanged guide shaft function 12. The register sequence-guide shaft function 37 comprises only one position offset 19 relative to the guide shaft function 12. The register sequence-guide shaft function 17 has a gear derivation from the guide shaft function 12; as a result, the register sequence-guide shaft function 17 has a different slope from the guide shaft function 12 and thus also a different period 39, compared to the period 38 of the guide shaft function 12. Because of the greater slope of the register sequence-guide shaft function 17, the associated period 39 is shorter.

Also shown in FIG. 2 is a correction function 16. It represents only the corrections relative to the guide shaft function 12 by which the register-tracking shafts 3, 4; 5, 8 are optionally corrected. Instead of the instantaneous position a in angular degrees, an angular speed could for instance be provided as a transducer signal for the corresponding guide shaft functions/corrective functions.

List of Reference Numerals

1 Processing machine
2 Web of material
3 Transport shaft
4 Transport shaft
5 Processing shaft
6 Processing shaft
7 Processing shaft
8 Processing shaft
9 Individual drive mechanism
10 Drive regulator
11 Power electronics
12 Guide shaft function
13 Instantaneous position of the guide shaft
14 Register mark
15 Group of register-tracking shafts
16 Correction function
17 Register sequence-guide shaft function
18 Not used
19 Position offset
20 Offset adder
21 Gear element
22 Central region
23 Longitudinal direction of the web of material
24 Not used
25 Individual product
26 Product length
27 Longitudinal error per product length
28 Data bus
29 Sensor
30 Register regulator
31 Arithmetic unit
32 Not used
33 Driven cylinder
34 Contact-pressure cylinder
35 Pivot axis of the driven cylinder
36 Pivot axis of the contact-pressure cylinder
37 Register sequence-guide shaft function with position offset only
38 Period of the guide shaft function
39 Period of the register sequence-guide shaft function
40 Guide shaft generator
41 Guide shaft generator
42 Parameter line
43 Group
44 Scanning point
45 Spacing of the processing point from the scanning point
S Set-point value transducer
101 Drive mechanics
102 Machine shaft, derived
103 Drive mechanism
L Guide shaft
F Following guide shaft
105 Machine shaft
106 Gear module for deriving the following guide shaft
107 Fine gear module for deriving the following guide shaft
108 Offset action upstream of the derivation of the following guide shaft
109 Offset addition downstream of the derivation of the following guide shaft
110 Machine shaft, derived
111 Machine shaft, derived
116 Additional position offset
117 Group of shafts
118 Downstream guide shaft
119 Real guide shaft
120 Virtual guide shaft
121 Positioning module
122 Guide shaft cycle
123 Synchronization module
124 Upstream offset module
125 Downstream offset module
126 Regulator module
127 Additional offset module
128 Following guide shaft cycle
129 Guide shaft cycle
130 (Drive) gear module
131 Drive/fine gear module
132 Reversing switch
133 Drive offset module
134 Drive offset addition
135 Mechanical gear
137 Motor
138 Machine 139 Machine shaft derived directly from the guide shaft L
140 Feeding direction
141 Take-down spool
142 Take-up spool
143 Tensile stress adjustment/web memory
144 Web of material
145 Transport shaft
146 Transducer
147 Machine shaft

What is claimed is:

1. A method for operating machines (138) with a plurality of synchronized shafts (102, 110, 111, 141, 142, 145), in which the shafts (102, 110, 111, 141, 142, 145) are each driven, synchronized with one another, by individual drive mechanisms (103) belonging to them, in accordance with an electronic, chronological guide shaft function, which corresponds to an instantaneous position (13) of a guide shaft L, and the motions of a plurality of derived shafts (102, 110, 111) are derived from the guide shaft L in accordance with conversion functions that correspond to respective predetermined mechanical conversions (106, 107, 108, 109) with respect to the guide shaft L, characterized in that all the shafts (102, 110, 111) of at least one group (117) of shafts, which correspond to one another in terms of the conversion (106, 107, 108, 109), obey an electronic, chronological following guide shaft function, which corresponds to an instantaneous position of a following guide shaft F and is formed by linking the applicable conversion function and the guide shaft function.

2. The method of claim 1, characterized in that the conversion function includes a position offset, determined by the mechanical conversion (108, 109), relative to the instantaneous position (13) of the guide shaft (L).

3. The method of claim 1 or 2, characterized in that the conversion function includes a RPM offset, determined by the mechanical conversion (108, 109), relative to the instantaneous speed of the guide shaft (L).

4. The method of one of claims 1–3, characterized in that the conversion function includes a function determined by the mechanical conversion (106, 107) and corresponding to a gear speed increase relative to the guide shaft L.

5. The method of one of claims 1–4, characterized in that a fine tuning (107) and/or a position offset (108, 109) and/or a RPM offset of the conversion function formed manually and/or in accordance with a regulator, in particular a register regulator, tension regulator or dance regulator, is provided.

6. The method of claim 5, characterized in that the fine tuning (107) and/or the position offset (108, 109) and/or the RPM offset is effected practically instantaneously relative to an updating cycle of the set-point guide shaft function values involved.

7. The method of one of claims 1–6, characterized in that an additional position offset (116) is provided, which acts on only one following guide shaft signal, generated in accordance with the following guide shaft F, which signal is transmitted to the drive mechanism (103) of the respective shaft (102, 110, 111) of one group (117), so that the applicable shaft (102, 110, 111) is offset from the following guide shaft F by the amount of this position offset (116).

* * * * *